Feb. 6, 1923.
P. B. SHEE.
METHOD OF MAKING GEAR WHEELS.
FILED MAR. 15, 1920.
1,444,213.
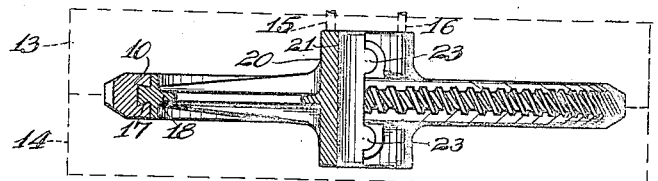
Fig. 2
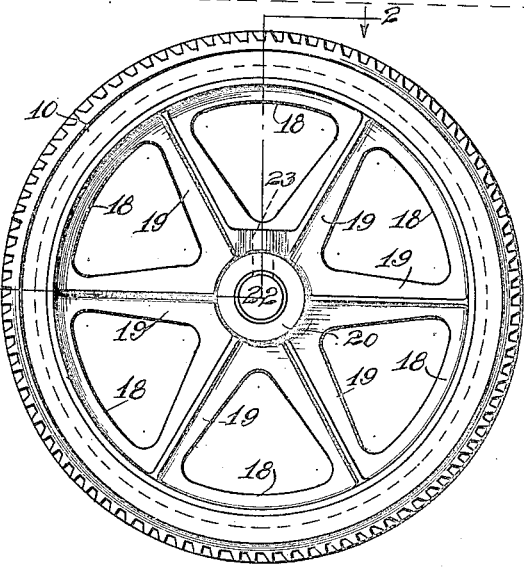
Fig. 1
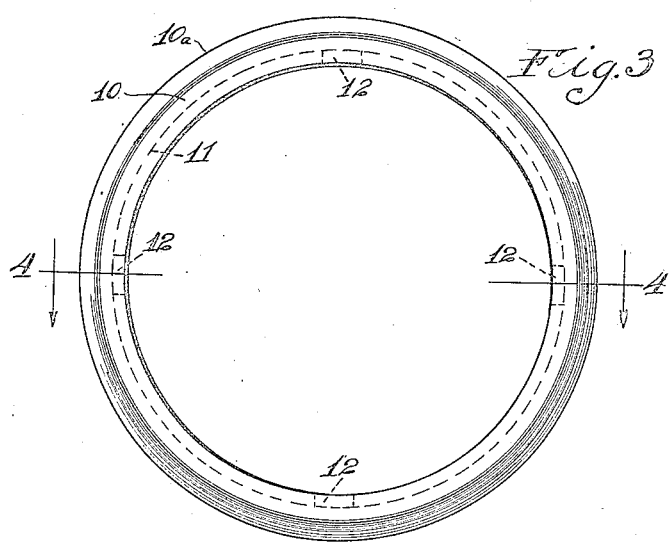
Fig. 4
Fig. 3
WITNESS:
Wm Casati
INVENTOR.
Parke B. Shee
BY Arthur L. Sprinkle
ATTORNEY.

Patented Feb. 6, 1923.

1,444,213

UNITED STATES PATENT OFFICE.

PARKE B. SHEE, OF OAK PARK, ILLINOIS.

METHOD OF MAKING GEAR WHEELS.

Application filed March 15, 1920. Serial No. 365,773.

*To all whom it may concern:*

Be it known that I, PARKE B. SHEE, a citizen of the United States, residing at Oak Park, in the county of Cook and State of Illinois, have invented certain new and useful Improvements in Methods of Making Gear Wheels.

The invention relates to gear wheels of the type ordinarily employed in driving fast moving parts and more particularly relates to worm gears adapted to impart a rapid degree of rotation to a worm or spiral gear as for example the spiral gear on the bowl spindle of a centrifugal separator. The bowl spindle of a centrifugal separator is ordinarily made of steel and it has become the common practice to form the spiral gear or worm integrally thereon. These bowl spindles rotate very rapidly, ordinarily from 8,000 to 14,000 revolutions per minute and it has become the common practice in machines of this character to form the gear wheel which drives the bowl spindle of phosphor bronze. There are may grades of phosphor bronze but a common form is that made by amalgamating copper, tin, antimony and phosphorus. This produces a compact material which possesses suitable enduring and wearing qualities in which the helical gear teeth may be formed for engaging the steel worm on the bowl spindle. Phosphor bronze may be cast by ordinary methods of brass casting as for example in a sand mold and the practice has become quite general of forming the entire gear of phosphor bronze by a single casting operation and afterwards machining the hub and rim or peripheral portions as desired. No suitable commercial substitute for copper has been found and the price of a solid phosphor bronze gear of a size suitable for use in a cream separator for driving a bowl spindle will become almost prohibitive. It has also been found that solid phosphor bronze gears used for driving centrifugal bowl spindles being of a composition analogous to bell metal are noisy.

It is the object of the present invention to provide an improved method of making a gear having a peripheral portion formed of suitable high grade wearing material as phosphor bronze to which it is closely united a central portion consisting of a rim, spokes or web and hub of an inferior, softer, cheaper metal, or composition of metals, the two parts being closely united so that the wheel operates as an integral gear and is less noisy than a solid phosphor bronze gear.

Other objects of the invention will appear from the following specification descriptive of the improved gear and method of manufacturing same, reference being had also to the drawings forming a part of the specification.

In the said drawings Fig. 1 is a plan view of one side of the gear wheel made in accordance with the principles of the invention. Fig. 2 is a view of the same gear wheel partly in section, the section being taken on line 2—2 of Fig. 1. In this view there is also shown in broken outline the general form of a two-part mold in which the molten metal for casting the central portion of the wheel is united to the phosphor bronze peripheral portion by introducing the molten material for forming the central portion of the wheel into the mold under pressure as described. Fig. 3 is a side elevation view of the gear ring after being cast and before being united in the final casting operation with the interior portion of the wheel including the spokes and hub. Fig. 4 is a sectional view on line 4—4, Fig. 3.

The peripheral portions or gear rims are first cast from phosphor bronze or other metals of suitable gear forming quality according to the construction as shown in Figs. 3 and 4. In order that the completed gears may be provided with the desired helical teeth the outer peripheries of the rims 10 are narrowed as indicated at 10$^a$ and the interior peripheries are grooved as indicated at 11, the grooves being undercut and provided with one or more integral lugs on the interior of the groove as indicated at 12. These integral lugs are of importance in insuring that no amount of strain will ordinarily enable any turning movement between the gear rims and the interior portions of the completed wheel.

The method of forming the gear wheels after the peripheral rims are cast and cooled is to place the rims in a specially formed mold of the character ordinarily used in die casting. The two parts of such a mold containing when assembled a hollow interior for casting the completed wheel are designated by the reference characters 13 and 14, Fig. 2, the mold being provided with one or more tubes for feeding metal to the mold under pneumatic pressure, such tubes being indicated by the reference characters 15, 16 in Fig. 2. The parts of the mold 13 and 14 are ordinarily made of steel or analogous metal similar to the molds used in die casting. A suitable composition of inferior metals for use in die casting in which lead, zinc, tin and the like may predominate is then introduced under pressure to the interior of the mold through the feed tubes 15 and 16 and this pressure ordinarily amounting to about three hundred pounds per square inch is maintained until the metal on the interior of the mold filling the cavity therein not occupied by the phosphor bronze rim 10 is completely filled and cooled or almost completely cooled to the normal temperature of the previously cast and cooled phosphor bronze rim 10. The metal flowing under pressure through the tubes 15 and 16 will accumulate in the mold, filling the undercut groove 11 therein by material as indicated by the reference character 17, Fig. 2. The fact that the metal is under high pressure insures a complete union of the wheel felloe with the rim 10 and the casting will be so compact that the felloe 18 as well as the peripheral portion 17 filling the undercut groove 11 will be retained at all times in close association with the materials of the rim after the parts are completely cooled and a complete union of these parts of the wheel with the spokes 19 and hub portion 20 will result, this producing a perfectly formed die casting which is ready for use with little or no machine work after being cooled and taken from the mold. For example, the mold may be formed with a central stud 21 which will result in the formation of a central bore 22 in the hub of the wheel and branches on the stud 21 or adjacent thereto may be employed in casting apertures 23 extending radially of the wheel axis, which may be subsequently threaded by the simple operation of a thread cutting tool to accommodate the ordinary set screws used in securing a wheel of this character to its supporting shaft with which the worm wheel is fixedly secured according to the usual construction.

By constructing the wheel in this manner according to the method described the die casting comprising the central portion of the wheel comes from the mold in a clean form without adhering sand and with its central opening and principal bearing surfaces so accurately formed as to require ordinarily nothing more than a slight smoothing or polishing operation and making it unnecessary to submit the casting to any expensive operations with jigs or forming devices.

Extensive experiments have demonstrated that it is impossible to cast the central portion comprising the hub, spokes and rim of these wheels by ordinary casting methods since upon cooling and shrinkage objectionable looseness will always result between the gear rims and the wheel felloe, and hence prior to my invention it has been impossible to satisfactorily construct the gear ring of a gear of this character of material having the desired wearing qualities satisfactorily united to the interior or central portions including spokes and hub of inferior and cheaper metals.

In the use of the ordinary sand cast gears on the interior of the gear box of a cream separator it is found that unless considerable expense is incurred in carefully cleaning adhering sand from castings the sand may become detached after the gears are assembled and entering the lubricating material in the casing cause serious difficulty in the cutting out of gear teeth, bearings and the like. This danger is obviated with gears constructed according to the invention since no part of the gear will come in contact with sand molds except the phosphor bronze ring casting which will be thoroughly cleaned in the machining and tooth cutting operation.

The gear will have the further advantage that the material of the die casting is not only relatively cheap, as compared with phosphor bronze, but is of a material which does not respond to vibrations like the phosphor bronze, which is analogous to bell metal, and hence gears constructed according to my invention are so cushioned against vibration as to be practically noiseless.

I claim:

1. The herein described method of forming a gear wheel which consists in first forming a rim portion of a metal adapted to have formed on the outer peripheral portion thereof gear teeth having suitable wearing qualities for engaging co-operating gears, said rim portion having formed around its inner periphery suitable means for co-operatively engaging that portion of the wheel on the interior thereof comprising the hub and the means for connecting the latter with the rim portion, and after cooling said rim portion placing the latter in a mold and admitting to the interior of said mold molten metal under pressure and thereby forcing the molten metal into close contact with the rim portion and said means on the interior periphery thereof, thereby completing the gear wheel and by reason of said pressure upon the molten metal preventing shrinkage between the inner portions of the wheel and its rim upon cooling.

2. The herein described method of forming a gear wheel which consists in first forming a rim portion of a metal adapted to have formed on the outer peripheral portion thereof gear teeth having suitable wearing qualities for engaging co-operating gears, said rim portion having formed around its inner periphery suitable means for co-operatively engaging that portion of the wheel on the interior thereof comprising the hub and the means for connecting the latter with the rim portion, and after cooling said rim portion placing the latter in a mold and admitting to the interior of said mold molten metal under pressure and thereby forcing the molten metal into close contact with the rim portion and said means on the interior periphery thereof, thereby completing the gear wheel and by reason of said pressure upon the molten metal preventing shrinkage between the inner portions of the wheel and its rim upon cooling and eliminating the necessity of subsequent finishing operations upon the hub portions of the wheel.

In testimony whereof I have signed my name to this specification, on this 9th day of March, A. D. 1920.

PARKE B. SHEE.